United States Patent [19]

Sack

[11] Patent Number: 5,124,911
[45] Date of Patent: Jun. 23, 1992

[54] METHOD OF EVALUATING CONSUMER CHOICE THROUGH CONCEPT TESTING FOR THE MARKETING AND DEVELOPMENT OF CONSUMER PRODUCTS

[75] Inventor: Michael C. Sack, London, England

[73] Assignee: Image Engineering, Inc., London, England

[21] Appl. No.: 181,800

[22] Filed: Apr. 15, 1988

[51] Int. Cl.⁵ .......................................... G06F 15/36
[52] U.S. Cl. .................................................. 364/401
[58] Field of Search ............... 364/401, 419, 225 MS; 434/107, 188, 236, 433

[56] References Cited

PUBLICATIONS

Dillon, W., et al., *Multivariate Analysis*, pub. by John Wiley and Sons, copyright 1984, pp. 107–153.
*ADMAP*, Sampson, P., "BASES: A Way Ahead for New Product Development", Nov. 1983, pp. 594–600.
*Journal of Marketing Research*, vol. 20, Urban, G., et al., "Pre-Test-Market Models: Validation and Managerial Implications", Aug. 1983, pp. 221–234.
*Journal of Business Research*, vol. 10, Moore, W., "Concept Testing", 1982, pp. 279–294.
*Journal of Marketing*, vol. 45, Green, P., et al., "A General Approach to Product Design Optomization Via Conjoint Analysis", 1981, pp. 17–37.
*Journal of Marketing Research*, vol. 16, Shocker, A., et al., "Multiattribute Approaches for Product Concept Evaluation and Generation", May 1979, pp. 159–180.
*Journal of Consumer Research*, vol. 5, No. 4, Hauser, J., et al., "Assessment of Attribute Importances and Consumer Utility Functions . . . ", Mar. 1979, pp. 251–262.
*Journal of Marketing Research*, vol. 15, Silk, A., et al., "Pre-Test-Market Evaluation of New Packaged Goods . . . ", May 1978, pp. 171–191.
*Operations Research*, vol. 25, No. 4, Hauser, J., et al., "A Normative Methodology for Modeling Consumer Response to Innovation", Jul. 1977, pp. 579–619.
Meyers, J., et al., *Market Structure Analysis*, pub. by the American Marketing Association, copyright 1977, pp. 90–137.
*Management Science*, vol. 21, No. 8, Urban, G., "PERCEPTOR: A Model for Product Positioning", Apr. 1975, pp. 858–871.

Primary Examiner—Stephen M. Baker
Attorney, Agent, or Firm—Pennie & Edmonds

[57] ABSTRACT

A method of concept testing which includes performing a multi-attribute evaluation of prompts comprising concepts and existing products which compete in the same consumer market, eliciting from consumers evaluations of the extent to which each attribute ideally should be possessed by a product in the same consumer market, eliciting from consumers evaluations of their likelihood of purchasing the existing products and products described by the prompts, performing an independence factor analysis, and calculating for each prompt the deviation of the attribute evaluation from the mean.

15 Claims, 2 Drawing Sheets

METHOD OF EVALUATING CONSUMER CHOICE THROUGH CONCEPT TESTING FOR THE MARKETING AND DEVELOPMENT OF CONSUMER PRODUCTS

BACKGROUND OF THE INVENTION

This invention relates to quantitative methods for evaluating consumer response to a product idea prior to the introduction to the market of an actual product which embodies that idea and for generating communication designed to alter consumer attitudes toward existing products. These methods involve the evaluation by consumers of product concepts having certain rational benefits, such as "a detergent that removes stains but is gentle on fabrics," or non-rational benefits, such as "a shampoo that lets you be yourself." Such methods are commonly referred to as concept testing and have been performed using field surveys, personal interviews and focus groups, in combination with various quantitative methods, to generate and evaluate product concepts.

The concept generation portions of concept testing have been predominantly qualitative. Advertising professionals have generally created concepts and communications of these concepts for evaluation by consumers, on the basis of consumer surveys and other market research, or on the basis of their own experience as to which concepts they believe represent product ideas that are worthwhile in the consumer market.

The quantitative portions of concept testing procedures have generally been placed in three categories: (1) concept evaluations, where concepts representing product ideas are presented to consumers in verbal or visual form and then quantitatively evaluated by consumers by indicating degrees of purchase intent, likelihood of trial, etc., (2) positioning, which is concept evaluation wherein concepts positioned in the same functional product class are evaluated together and (3) product-/concept tests, where consumers first evaluate a concept, then the corresponding product, and the results are compared.

Prior to this invention, concept testing has been inadequate as a means to identify and quantify the criteria upon which consumer preference of one concept over another was based. These methods were insufficient to ascertain the relative importance of the factors responsible for or governing why consumers, markets and market segments reacted differently to concepts presented to them in the concept tests. Without such information, market researchers and advertisers, with their expertise, could generalize, on the basis of a concept test, as to how consumers might react to the actual products or to variations of the tested concepts. Communication of the concept, as embodied in a new product, has generally been left to the creativity of the advertising agency. No systematic quantitative method was known, however, which could accurately identify the criteria on which the consumer choices were based and the contribution or importance of each criterion to the purchase decision. Therefore, previous concept testing methods have failed to provide market researchers with the complete information necessary for them to create products specifically tailored to satisfy a consumer group balance of purchase criteria.

Moreover, previous concept testing methods have failed to accurately quantify the relationships between consumer response to concepts and consumer choice of existing products which compete in the same consumer market. Thus, the prior methods were unable to provide a communication of the benefits of a consumer product, closely representing the tested concept, to a degree of accuracy commensurate with that of the present invention.

These problems of concept testing have been identified in business and marketing journals. For example, in Moore, William L., *Concept Testing,* Journal of Business Research 10, 279-294 (1982), a literature survey and review of concept testing methodology, it is pointed out that concept tests have failed to account for changes between the concept tested and the communication describing the benefits of the product which embodies the concept. The Moore article reports that "no amount of improvement in current concept testing practices can remedy these problems." This is reflective of the fact that none of the prior methods provided a quantitative means for ascertaining the relative importance of the underlying criteria of concept choices as a means for identifying the visual and verbal expressions of the concepts which best communicate the benefits sought by the consumer. Nor did the prior methods quantify the relationships between concepts and existing products offered in the same consumer market. The ability of the method of the present invention to ameliorate or overcome the above shortcomings provides substantial improvment in communication of the concepts identified in testing and offered to the market as a product.

SUMMARY OF THE INVENTION

The present invention is a novel method of consumer product concept testing which utilizes a unique combination of qualitative methods to guide concept generation and quantitative concept evaluation. More specifically, the method of this invention provides a model of consumer choice based upon multi-attribute evaluations of both concepts and existing products similarly positioned in the market which, when combined with effective methods of concept generation, not only identifies the relative appeal to consumers of alternative products and concepts of products and the criteria on which those choices are based, but also the relative importance of each criterion to the choice.

The concepts to be tested are preferably generated in accordance with a systematic, qualitative approach. Product benefits are elicited from consumers in qualitative interviews to determine what positive characteristics the consumers associate with similarly positioned products. The benefits elicited are both rational and non-rational. The products are usually identified by brand and are currently available for purchase in the consumer market. The interviews are preferably projective in that they include the elicitation of product benefits which, to the consumer, personify the products. The market researcher, with this information, then guides the generation of concepts, including verbal and visual expressions which represent the benefits which consumers associated with the similarly positioned products.

The key to the success of this invention resides in its ability to quantitatively identify the criteria upon which consumer choices of concepts are based and the importance of each criterion to the consumer choice. This invention recognizes that the decision of a consumer to purchase a product is, in most cases, based upon little more than 3 to 5 factors. This invention utilizes 30 to 50 attributes in multi-attribute evaluation of products and concepts, which attributes are grouped, by independence factor analysis, into clusters. These clusters represent the underlying factors of the consumer purchase decision.

In carrying out the invention, a squeeze analysis of the attributes is performed whereby the attributes, on the basis of the attribute evaluations, and the factors, on the basis of representative attribute evaluations within each cluster, are ordered in accordance with their relative contribution or importance to the purchase decision. This ordering is achieved by squeezing a multidimensional matrix and remeasuring the Euclidean distances thereon between points representing the evaluated products and concepts and the point representing an evaluated reference product, usually the ideal. These distances are reordered to match the order of the preferences or purchase intent expressed by the consumers for the respective products and concepts.

The determination of the relationships between these Euclidean distances and evaluations of purchase intent for existing products, as well as for concepts, constitutes a pattern that is revealing of the considerations upon which consumers make purchase decisions. This connection between the criteria underlying consumer behavior in the actual market and in choosing between concepts has not previously been achieved and leads to better targeting of product and communication development.

This information thus is singularly valuable to quantitatively identify the verbal and visual expressions which most effectively communicate the promises or product benefits which have been identified as the most important criteria in consumer choice. These visual and verbal communications are useful, for example, in creating or altering a marketing strategy for consumer products, changing or creating the images of a consumer product through advertising and in targeting consumer groups.

DESCRIPTION OF THE PREFERRED METHOD OF CARRYING OUT THE INVENTION

Figure 2:
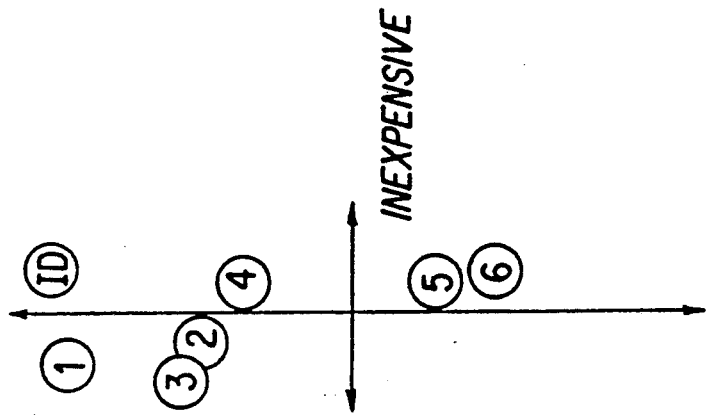
FIG. 2 illustrates the effect upon the multidimensional matrix, as depicted in FIG. 1, caused by a squeeze analysis of the attributes.

A multi-attribute evaluation of prompts, comprising existing products and concepts of products which are similarly positioned in the consumer market, is performed using a method which will result in an acceptable level of behavioral variance among consumers within a product class. The method of attribute evaluation used in this process should achieve over 70% and, preferably, over 90% behavioral variance. This is essential for the process to provide information regarding patterns of decision making, based on importance of criteria, and to successfully communicate the benefits of products embodying the tested concepts.

The evaluations are limited to products and concepts found in the same consumer category or market based upon identity or similarity of product use. For example, products and concepts useful in haircare may be tested for a particular benefit such as superior rinsability.

In a preferred method of attribute evaluation for use in the method of this invention, consumers are presented with a group of related products in qualitative, open-ended interviews and requested to identify words or phrases which describe each product. The creation of sample consumer groups and structuring of interviews for this purpose are established according to conventional statistical guidelines.

The next step in performing a preferred method of attribute evaluation is the selection of the appropriate set of attributes to be used in the evaluations. Using various qualitative interviewing techniques, consumers are requested to identify (1) rational descriptors, which describe the products in terms of function or physical characteristics, and (2) emotional descriptors, which describe the emotional reasons which the consumers have for choosing a product such as, for example, status, feelings of trust in the brand, personal identification with the brand or the communication of its benefits in advertising media, and which include (i) stereotype descriptors, which consumers use to describe the demographic traits of users of the products and (ii) personality descriptors which consumers use to personify brands or products.

The descriptors obtained in the above enumerated three areas are usually 1000 to 2000 in number which, number is initially reduced by various qualitative interviewing techniques, to reduce the number of descriptors, usually to approximately 100 to 200, thereby enabling the subsequent application of statistical analyses to further reduce such numbers. These techniques preferably include so-called game playing techniques, wherein consumers try to suggest a given product, using attributes. The redundant descriptors are eliminated from consideration as attributes and will not be used in the quantitative interviews.

The descriptors remaining after the initial reduction are then submitted in quantitative interviews to consumers, in association with the products, wherein consumers are requested to evaluate the extent or degree to which each descriptor presented to him is attributable to each product presented to him in the interview. Evaluations are obtained for all remaining descriptors and for all products overall, although all products and all descriptors preferably are not presented to each consumer in the interviews. A preferred method of quantitative interviewing is the SCRIBE computer aided interview, available from Frost International Research, whereby consumers are shown a monitor listing various items and are requested to cause a cursor or other indicator, using a hand-held control, to move along a line visually representing a linear scale of the degree or extent to which a descriptor describes, is associated with or is otherwise attributable to each product. The process is repeated among a representative sample of consumers, created on the basis of standard statistical guidelines. All data are preferably not presented to each consumer, as pointed out above, but each product is evaluated sufficiently with respect to each descriptor so that the data is sound and within generally accepted confidence levels.

A discriminant analysis for the set of descriptors is performed. A discrimination index is thereby formed wherein each descriptor is assigned a value which represents the extent to which that descriptor discriminates between products among all of the consumers interviewed. The evaluated descriptors are then ordered according to their respective ranks in the discrimination index. The final set of attributes to be used in the final quantitative interviews are chosen from the descriptors on the bases of rank in the discrimination index and ability to provide the greatest degree of behavioral variance and usually number between 30 and 50.

The final set of approximately 30 to 50 attributes is then presented to consumers in conjunction with existing products and concepts. In quantitative interviews, consumers are requested to evaluate the extent to which each attribute is attributable to each product. Also elicited from the consumers is the extent to which each attribute is attributable to ideal products or to one or more other reference products in the same product use category. During these final interviews, consumers are also requested to express a degree of preference for each product, which can be expressed as a preference for one item relative to the others, or as a degree of likelihood that the consumer would choose or purchase the item.

The concepts to be evaluated are generated by first eliciting from consumers in projective qualitative interviews benefits that consumers associate with existing products in the class of products to which the concepts to be tested relate. The benefits elicited are both rational and irrational. The interviews are preferably projective in that they result in the elicitation of benefits which include "characteristics" of the products as personified. The benefits elicited in the qualitative interviews are then used as a guide in the creation of verbal and visual concepts which represent or communicate the benefits elicited in the qualitative interviews. Devising the concept statement, visual image or combination thereof is the creative work of advertising professionals and, for the purpose of generating concepts for evaluation by the method of this invention, is preferably based upon benefits which are elicited by market researchers in the aforementioned projective interviews.

The concepts generated as described above and, preferably, additional concepts which are generated according to known methods, are submitted to consumers in quantitative interviews wherein the consumers evaluate the concepts using the attributes selected according to the method described above. This multi-attribute evaluation is also performed in the quantitative interviews with respect to existing benefit expression for products which are in the same category as the concepts, for example, as communicated in current advertising. These concepts and expressions are collectively referred to as prompts and are submitted to the consumer for attribute evaluation.

Another response elicited from the interviewed consumers, in addition to attribute evaluations, is an indication of likelihood of purchasing a product associated with the prompt. In this regard, the consumer is asked to rate, on a scale of 1 to 100, for example, what the likelihood is of that consumer purchasing some product which possesses the expressed benefits or which is represented by the concept presented.

A series of so-called data-check responses should be elicited from the consumers during the interviews to insure that the consumers understand the prompts being presented to them and that the market researcher properly interprets and applies the evaluations. In open-ended, qualitative inquiries, consumers are requested to identify their personal likes and dislikes about the prompt, expectations of the usefulness and quality of the prompt, the credibility of the given purpose of the prompt, identification of purposes other than the given purpose which would be appropriate for the prompt and, generally, to spontaneously respond to the main idea or purpose of the prompt. These responses may indicate a misunderstanding of a given prompt on the part of a consumer, which might justify disregarding his evaluation related to that prompt.

The success of the market researcher in creating the concepts to reflect the respective elicited product benefits is also preferably checked by requesting the consumers to evaluate the extent to which the benefits, which were the basis of the created concept, are attributable to that concept. Consistently poor results may justify rejecting the created concept as a poor representation or communication of the benefits which the concept was designed to communicate to the consumer.

An independence factor analysis of the attributes is then performed, using the quantitative data obtained from the attribute evaluations, whereby clusters of related attributes are formed and identified as factors representing the constructs of consumer behavior associated with distinguishing between the products.

A squeeze analysis of the attributes and factors is then performed, wherein a point representing each product and each reference product, for a given purpose or product positioning, is then plotted on a multi-dimensional matrix based upon the attribute evaluations for each respective product and reference product. The relationships between the points representing the products are best represented by the Euclidean distance across hyperspace between these points and the point representing the reference product on the multi-dimensional matrix and by a comparison of those distances to the expressed likelihoods of purchase, i.e., preferences, for the respective products. The reference product used is preferably a theoretical ideal product for which consumers are requested to evaluate the extent to which each attribute would ideally be possessed by that product. The reference product can also be an actual product, such as, for example, the brand most often used or purchased by consumers or the product most frequently identified as the brand currently used by the consumers.

Each factor and each attribute is rated by performing a squeeze analysis of the attributes whereby the Euclidean distances between the points on the matrix representing each item and the ideal or other reference item are brought into inverse correspondence with to the expressed preferences for i.e., expressed likelihoods of purchasing, the respective products. These attribute ratings indicate the relative contribution of each factor and each attribute to the consumers' choice or purchase decision.

Figure 1:
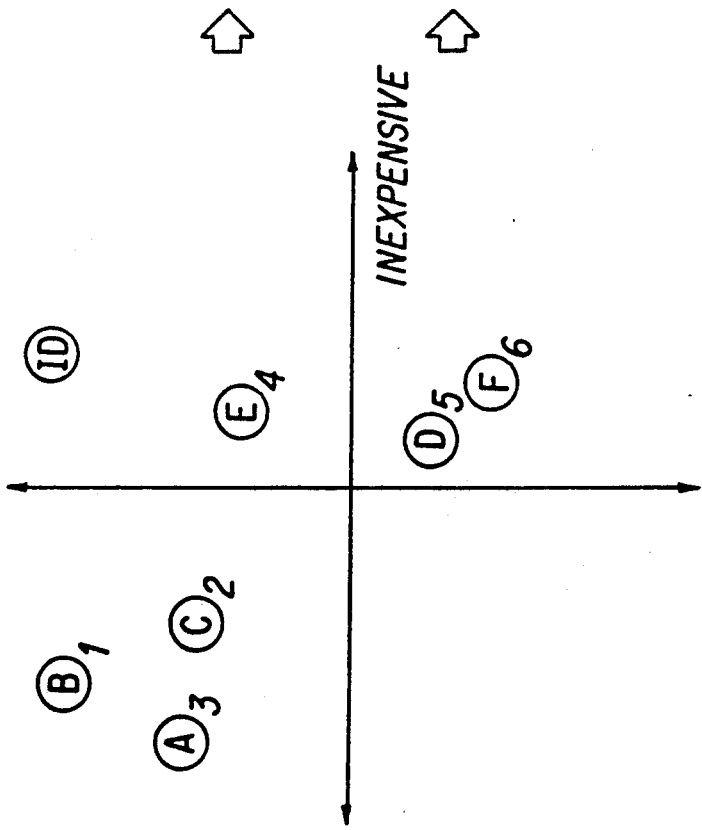
FIG. 1 is a depiction of two dimensions of the multidimensional matrix, wherein points representing products and an ideal product have been plotted with respect to two attributes.

The multidimensional matrix is formed by plotting points representing each existing product and concept, based upon the attribute evaluations associated with them by the consumers. The number of dimensions of the matrix is equal to the number of attributes by which the products and concepts have been evaluated, which commonly number from 30–50. In FIG. 1, the positions of points representing six products or concepts are shown by circles containing the letters "A" through "F" and the ideal by "ID", in two dimensional space defined by the evaluations of the attributes, "convenient" and "inexpensive," for a single consumer. Each point "A" through "F", representing a product or concept, is further associated with a subscript identifying its rank, in descending order, of expressed degree of preference or likelihood of purchase. The Euclidean distances between the points representing the ideal "ID"

and each item "A" through "F," respectively, are measured and a squeeze analysis of the attributes is performed, iteratively according to St. James' theorem, as depicted in FIG. 2 for the same two attributes shown in FIG. 1. The iterative squeeze is performed in accordance with any one of several known techniques. The attributes are rated so that the points "A" through "F," which have been numbered "1" through "6" in FIG. 2 to reflect their relative expressed likelihoods of being purchased, are realigned until the Euclidean distances between the ideal point and points "1" through "6" in FIG. 2, respectively, from short to long, are in the same order as the expressed likelihoods of purchasing each respective product, from greatest to least. The use of only two attributes, or dimensions, in FIGS. 1 and 2 is to enable a representative portion of the multi-dimensional matrix and squeeze analysis to be depicted in a two-dimensional medium. In creating the matrix and performing the squeeze analysis, all attribute evaluations are actually utilized. The values used to rate the attributes and factors to obtain the foregoing relationship between Euclidean distances on the matrix and degrees of likelihood of purchase are recorded as importance ratings, each of which is assigned to the respective attributes and factors and reflects the relative contribution of the attribute and factor as a criterion in the consumers' purchase decisions.

It is useful to analyze the data obtained from the attribute evaluations separately for market segments defined by various characteristics. It is therefore preferable to elicit from the consumers, during the interviews, demographic, attitude, opinion, product usage and other behavioral and characteristic information about each consumer which information may be used to define such market segments.

The results of the quantitative method of this invention are conveniently depicted in a factors map, created for each prompt, wherein the attributes are grouped in factors defined in the factor analysis and are ordered by their importance as criteria in the consumer purchase decision. Factors maps may also be created for target groups of consumers defined by responses to various questions posed during the interviews and designed to elicit demographic and/or purchase behavior characteristics of the consumers. The significant information to be derived from the factors maps are the differences between each attribute evaluation for the prompt and the mean of all attribute evaluations for all prompts. These differences are preferably expressed as standard deviations. The prompts for which such differences are significant deviations above that mean for factors which have the greatest contribution, i.e., are the most important criteria to the consumer purchase decision, are identified as the most desirable concepts and/or communications of benefits. This most effectively identifies to the market researcher the concepts which, when embodied in products, will most likely achieve high trial rates and become successes in the market. This also identifies to the market researcher the underlying criteria of the consumers' favorable ratings of concepts, expressed in terms of the same attribute evaluations, grouped as factors, which the consumers use in evaluating existing products and making purchase decisions.

Figure 3:
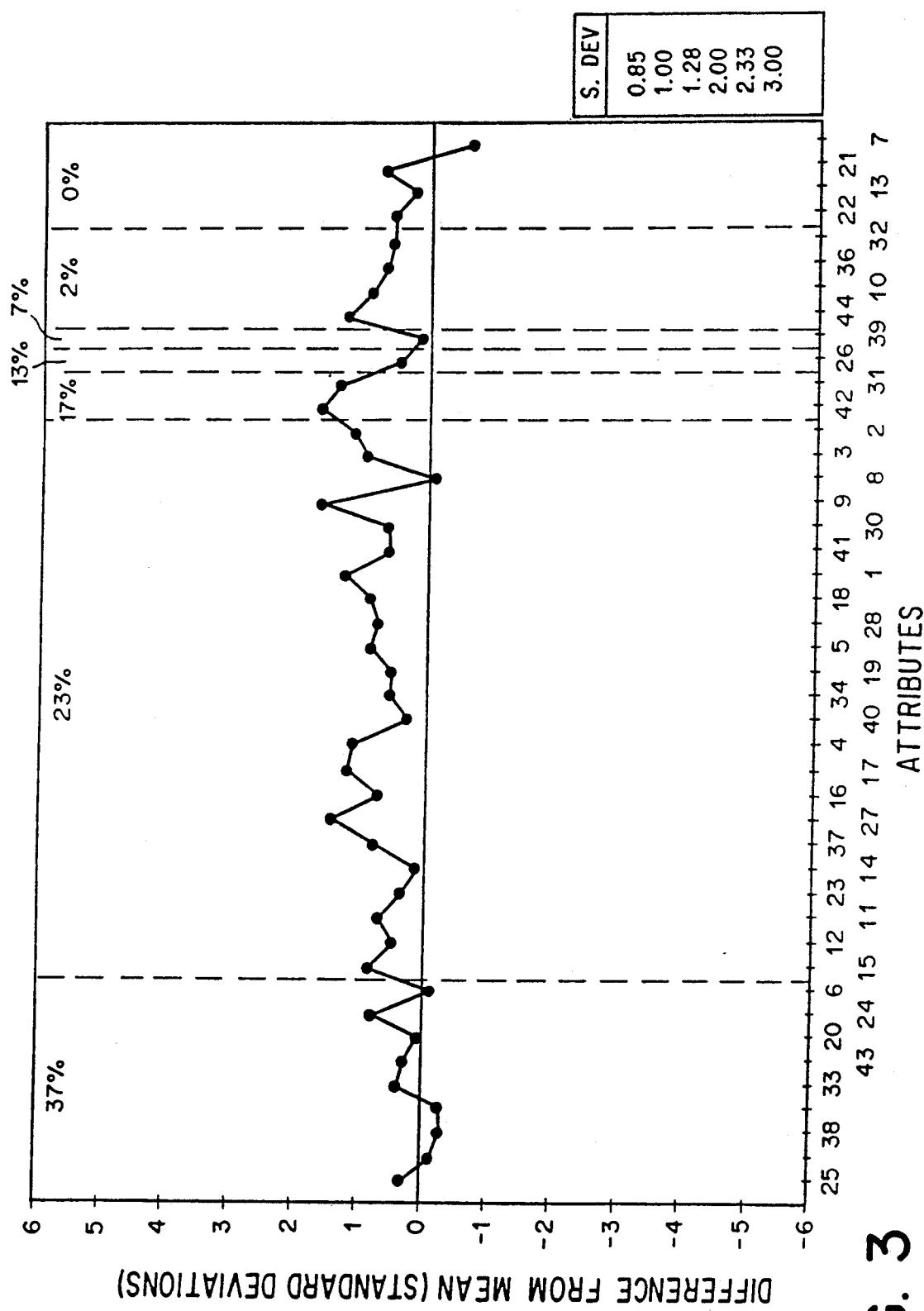
FIG. 3 is an example of a factors map for a concept.

An example of a factors map is depicted in FIG. 3. The factors, and attributes within each factor, are ordered, from left to right, in decreasing importance as criteria in consumer preference or purchase interest for the concept. The attributes are grouped as factors and shown within columns which represent the factors, separated by vertical dashed lines. The contribution of each factor to purchase intent, expressed as a percentage, is shown at the top of each column. The attributes are identified by number on the horizontal axis, and a scale of standard deviations is marked on the vertical axis. The mean of all attribute evaluations for all prompts is represented by a straight horizontal line and the points representing the attribute evaluations for each factor for that prompt are shown as deviating above or below that horizontal line and are connected by an irregular horizontal line.

Moreover, the entire spectrum of attribute evaluations and deviations of those evaluations, which are derived from each factors map, reveals to the market researcher the criteria upon which the consumer evaluations of the concept are based and the importance of each criterion to the consumer's decision to purchase a product embodying the concept. This provides the market researcher with the key to translating the concept into a product and to effectively communicating the benefits of that product in advertising.

It will be understood that the invention is not limited to the preferred illustrations and embodiments described above, but also encompasses the subject matter delineated by the following claims and all equivalents thereof.

I claim:
1. A method of concept testing comprising:
   a. performing a multi-attribute evaluation of prompts comprising concepts and existing products which compete in the same consumer market;
   b. eliciting from consumers evaluations of the extent to which each attribute ideally should be possessed by a product in the same consumer market;
   c. eliciting from consumers evaluations of their likelihood of purchasing the existing products and products described by the prompts;
   d. performing an independence factor analysis of the attributes whereby clusters of related attributes are formed and are identified as factors;
   e. performing for each prompt a squeeze analysis of the factors whereby (i) a matrix of factors is created wherein points defining the Euclidean distances between each product and the ideal product are plotted based upon the attribute evaluations associated with each product and (ii) a rating is assigned to each factor and to each attribute so that the Euclidean distances between the points on the matrix representing each product and the point representing the ideal product are re-ranked into the same order as the likelihoods of purchasing each product;
   f. calculating, for each prompt, the deviation of each respective attribute evaluation for that prompt from the mean of the attribute evaluations for all prompts.

2. A method according to claim 1 wherein the prompts are also comprised of communications of the benefits of existing products as currently communicated to the consumers in the market.

3. A method according to claim 1 wherein the attributes selected systematically provide a level of behavioral variance greater than 70%.

4. A method according to claim 1 wherein the attributes selected provide a level of behavioral variance of about 90% or greater.

5. A method according to claim 1 wherein the deviations of attribute evaluations for each prompt are calculated for market segments defined by characteristics identified in further consumer responses obtained during the eliciting steps.

6. A method according to claim 1 wherein the deviations of attribute evaluations are calculated by measuring on a factors map, for each prompt or for each purpose for each prompt, the distance between the points representing the respective attribute evaluations and the points representing mean attribute evaluations for other concepts or competitive products.

7. A method according to claim 1 wherein the evaluations in each concept test are further limited to concepts and products used for a given purpose.

8. A method according to claim 1 wherein the attributes used in the multi-attribute evaluation are comprised of rational, personality and stereotype descriptors.

9. A method according to claim 8 wherein the attributes used in the multi-attribute evaluations are selected from descriptors elicited from consumers on the basis of their ability to enable consumers to discriminate between products.

10. A method according to claim 9 wherein the attributes selected systematically provide a level of behavioral variance greater than 70%.

11. A method according to claim 9 wherein the attributes selected provide a level of behavioral variance of about 90% or greater.

12. A method for testing concepts comprising:
 a. eliciting from consumers descriptors of products including rational, personality and stereotype descriptors;
 b. submitting the descriptors to consumers in qualitative interviews in order to reduce the number of descriptors by eliminating those which the interviews indicate are least sufficient as bases for the consumers to distinguish between the products;
 c. eliciting from consumers quantitative evaluations of the extent to which the non-eliminated descriptors are attributable to the products;
 d. calculating a discrimination index of the evaluated descriptors whereby the least number of descriptors, which provide the most discrimination between items and which account for the greatest amount of behavioral variance over 70% among the interviewed consumers, are identified as attributes;
 e. eliciting from consumers in projective qualitative interviews benefits that communicate positive characteristics which consumers associate with similarly positioned products;
 f. creating concepts which represent the elicited benefits;
 g. eliciting from consumers evaluations of the extent to which the attributes are attributable to the existing products similarly positioned in the market;
 h. eliciting from consumers evaluations of the extent to which each attribute ideally should be possessed by a product similarly positioned in the market;
 i. eliciting from consumers evaluations of their likelihood of purchasing the products;
 j. exposing to consumers a set of prompts comprising (1) concepts representing the benefits that consumers associated with the products in step e, (2) other given concepts describing potential benefits of the products and (3) existing expressions of benefits of currently available products;
 k. eliciting from consumers evaluations of the extent to which each attribute is attributable to a product described by each prompt;
 l. eliciting from consumers evaluations of the likelihood of purchasing a product described by each prompt;
 m. performing an independence factor analysis of the attributes whereby clusters of related attributes are formed and are identified as factors;
 n. performing for each prompt a squeeze analysis of the factors whereby (i) a matrix of factors is created wherein points defining the Euclidean distances between each product and the ideal product are plotted based upon the attribute evaluations associated with each product and (ii) a rank is assigned to each factor and to each attribute so that the Euclidean distances between the points on the matrix representing each product and the point representing the ideal product are re-ranked into the same order as the likelihoods of purchasing each product.

13. A method according to claim 12 wherein the attributes selected provide a level of behavioral variance of about 90% or greater.

14. A method for testing concepts comprising:
 a. eliciting from consumers descriptors of products including rational, personality and stereotype descriptors;
 b. submitting the descriptors to consumers in qualitative interviews in order to reduce the number of descriptors by eliminating those which the interviews indicate are least sufficient as bases for the consumers to distinguish between the products;
 c. eliciting from consumers quantitative evaluations of the extent to which the non-eliminated descriptors are attributable to the products;
 d. calculating a discrimination index of the evaluated descriptors whereby the least number of descriptors, which provide the most discrimination between items and which systematically account for the greatest amount of behavioral variance over 70% among the interviewed consumers, are identified as attributes;
 e. eliciting from consumers in projective qualitative interviews benefits that communicate positive characteristics which consumers associate with similarly positioned products;
 f. creating concepts which represent the elicited benefits;
 g. eliciting from consumers evaluations of the extent to which the attributes are attributable to the existing products similarly positioned in the market;
 h. eliciting from consumers evaluations of the extent to which each attribute ideally should be possessed by a product similarly positioned in the market;
 i. eliciting from consumers evaluations of their likelihood of purchasing the products;
 j. exposing to consumers a set of prompts comprising (1) concepts representing the benefits that consumers associated with the products in step e, (2) other given concepts describing potential benefits of the products and (3) existing expressions of benefits of currently available products;
 k. eliciting from consumers evaluations of the extent to which prompts are associated with existing products;

l. eliciting from consumers evaluations of the extent to which each attribute is attributable to a product described by each prompt;

m. eliciting from consumers evaluations of the likelihood of purchasing a product described by each prompt;

n. performing an independence factor analysis of the attributes whereby clusters of related attributes are formed and are identified as factors representing constructs of consumer behavior associated with distinguishing between products;

o. performing for each prompt a squeeze analysis of the factors whereby (i) a matrix of factors is created wherein points defining the Euclidean distances between each product and the ideal product are plotted based upon the attribute evaluations associated with each product and (ii) a rank is assigned to each factor and to each attribute so that the Euclidean distances between the points on the matrix representing each product and the point representing the ideal product are re-ranked into the same order as the likelihoods of purchasing each product;

p. calculating for each prompt the deviation of each attribute evaluation for that prompt, from the mean of the attribute evaluations for all prompts, for groups of consumers defined by characteristics identified in further responses obtained during the eliciting steps.

15. A method according to claim 14 wherein the attributes selected provide a level of behavioral variance of about 90% or greater.

* * * * *